Sept. 29, 1970   A. NAZARETH, JR   3,530,713
A.C. MAGNETIC FLOWMETER WITH D.C. BIAS ON ELECTRODES
Filed Dec. 26, 1967
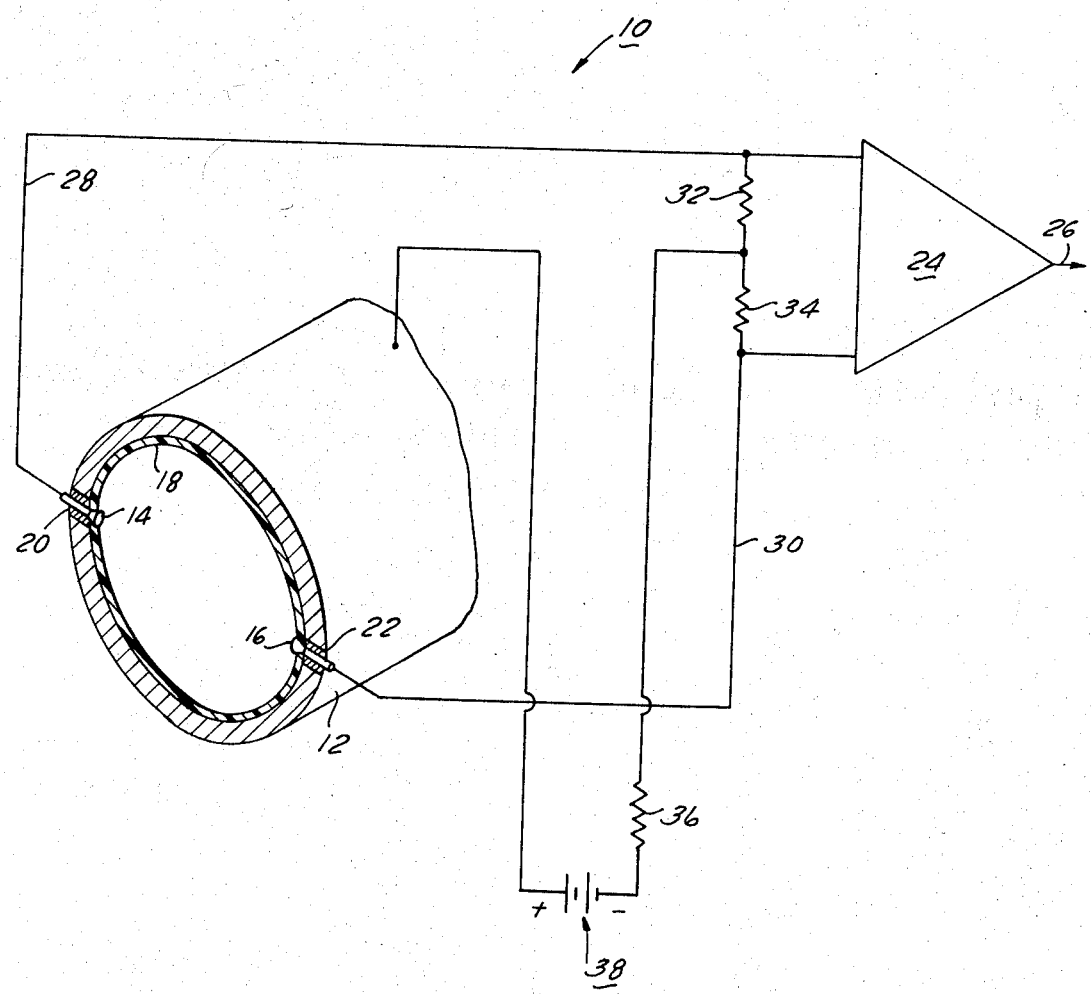
INVENTOR
ALFRED NAZARETH, JR
BY
Curtis Morris + Safford
ATTORNEYS

United States Patent Office 3,530,713
Patented Sept. 29, 1970

3,530,713
A.C. MAGNETIC FLOWMETER WITH D.C. BIAS ON ELECTRODES
Alfred Nazareth, Jr., Rehoboth, Mass., assignor to The Foxboro Company, Foxboro, Mass.
Filed Dec. 26, 1967, Ser. No. 693,663
Int. Cl. G01p 5/08
U.S. Cl. 73—194                                                5 Claims

ABSTRACT OF THE DISCLOSURE

A magnetic flowmeter wherein an A.C. magnetic field is produced in the interior of a flow pipe carrying a liquid and a pair of electrodes mounted on opposite sides of the pipe contact the liquid to develop an A.C. signal proportional to the rate of fluid flow, there also being provided a source of D.C. potential arranged to apply to the electrodes a negative bias to reduce the error-producing effects of what appears to be contamination of the electrode surface.

---

This invention relates to flowmeters of the magnetic type. More particularly, this invention relates to means for minimizing the deterioration in flowmeter performance which results from an apparent contamination of the flowmeter electrodes.

Magnetic flowmeters have been used commercially for a number of years to measure the flow rate of electrically conductive liquids. Such flowmeters typically include a pair of magnetizing coils arranged to produce in the liquid an A.C. magnetic field extending transversely to the direction of flow. Movement of the liquid through this magnetic field serves to generate a corresponding electric potential proportional to the rate of flow, and the potential is sensed as a flow signal by a pair of electrodes positioned in contact with the liquid on opposite sides of the flow pipe. This flow signal is amplified to a power level sufficiently high to operate an indicator, recorder or controller. Various features of prior magnetic flowmeters are disclosed in U.S. Pats. 2,867,119; 2,949,551; and 3,006,188.

One problem which has been encountered with prior flowmeters is that their measurement performance may tend to deteriorate over a period of time. For example, the accuracy of measurement may diminish significantly or become erratic, sometimes over a period as long as a few days or several weeks. In certain cases, the reading may drift after the flow has been stopped. Such a zero "offset" can be quite troublesome, particularly if the flowmeter output serves as the measurement signal for a controller used to position an operating valve of an industrial process, because the valve may be set to correspond to a small flow when in fact there is no flow.

The exact cause of such deterioration in performance is perhaps not fully understood at the present time. Nevertheless, there are some experimental indications that the problem is related to certain effects which seem in the nature of contamination at the interface between the flowmeter electrodes and the liquid in the flow pipe. These effects evidently need not appear in the form of physical coating of visible particles, although such a coating may be present concurrently with the deterioration in performance.

In any event, after the deterioration in performance has set in, accurate functioning of the flowmeter can temporarily be restored by flushing out the section of pipe containing the electrodes, for example by conventional flushing techniques, using various chemicals where appropriate. Such restoration of proper performance by flushing tends to support the supposition that the observed deterioration is due to a surface contamination phenomenon at the electrodes.

Periodic flushing of a flow pipe is, of course, not a satisfactory solution to the problem. Not only is the procedure expensive in terms of required manpower, but also it requires that the process be shut down for a relatively long period of time, and such down time may be quite costly due to loss of production. Moreover, there will necessarily be some deterioration in performance between each flushing, reaching a peak of degradation just before each flushing operation.

Accordingly, it is a principal object of this invention to provide novel means and techniques for minimizing the deterioration in performance of a magnetic flowmeter resulting from an apparent contamination of the interface between the electrodes and the process liquid. Specific aspects of the invention will be pointed out in the following description of a preferred embodiment of the invention, considered together with the accompanying drawing which is a partially perspective and partially schematic showing of a flowmeter incorporating the present invention.

In a presently preferred embodiment of the invention, described hereinbelow, means are continuously operative while the flowmeter is functioning to apply to the flowmeter electrodes a small D.C. voltage of negative polarity relative to the potential of the liquid. This voltage has the effect of significantly reducing the deterioration in flowmeter performance which otherwise results from an apparent contamination of the electrodes after a prolonged period of contact with the flowing liquid.

Although the precise technical nature of such contamination may not be clear at the present time, it seems reasonable to assume from the available evidence that by some electrochemical action there is developed at the electrode surface a non-conductive layer tending to create an electrical capacitance in series between the electrode and the flow-signal amplifier. Possibly this non-conductive layer results from the presence of polarized water molecules, e.g. the layer may be formed of ionized hydrogen which has been neutralized by the addition of electrons given off by thermal agitation of the electrode material. Possibly such a non-conductive layer is developed at the surface of the electrodes by a process analogous to that occurring in an electrolytic condenser.

In any event, non-conductive (dielectric) material at the surface of the electrodes would increase the apparent internal impedance of the A.C. generator represented by the magnetic flowmeter, and such increased impedance could give rise to the observed deterioration in performance. For example, the accuracy or stability of flow measurement could be affected by increased coupling of stray currents or fields into the input circuit of the amplifier as a consequence of the increase in internal impedance of the flowmeter head. An increase in capacitive impedance also might produce adverse effects by shifting the phase of the A.C. flow signal. Thus, it now seems probable that some phenomenon at the surface of the electrodes can be responsible for the observed gradual deterioration in performance of a magnetic flowmeter over a relatively long period of operation.

What ever the cause of such deterioration in performance, significant improvement is achieved by application of a negative bias voltage to the flowmeter electrodes in accordance with this invention. It has been suggested that possibly this negative bias serves to repel negative ions from the electrode surface, and thereby prevent the development of an accumulation of such ions in that region.

Turning now to the preferred embodiment, and referring to the drawing, the flowmeter structure 10 includes a metal pipe section 12 through which flows the liquid whose flow rate is to be measured. Two electrodes 14 and 16 are positioned opposite one another in the walls of the pipe to contact the flowing fluid. These electrodes have relatively broad heads which are substantially flush with the internal surface of an insulated liner 18 on the inside of the pipe. Insulating bushings 20 and 22 protect the stems of the electrodes from electrical contact with the metal pipe.

An A.C. magnetic field is applied to the pipe 12 by electromagnetic means, such as a pair of coils (not shown). The magnetic field extends perpendicular both to the direction of flow of the liquid through the pipe and to a line joining the two electrodes 14 and 16. The flow of the liquid through the pipe generates between the electrodes 14 and 16 an alternating current potential which is conducted by means of leads 28 and 30 (surrounded by conventional shields, not shown) to a high-impedance alternating-current differential amplifier 24. The output signal of the amplifier 24 is delivered over output lead 26 to one or more of a variety of recording or flow-controlling devices. As is known, the magnitude of the signal input to the amplifier is directly proportional to the flow rate through the pipe.

In accordance with the present invention, a direct bias voltage of negative polarity is applied between each of the electrodes 14 and 16 and the liquid in the pipe 12 to reduce the error-producing effects of apparent contamination of the surfaces of the electrodes. It is preferred that the magnitude of the bias voltage be maintained between 0 and −1 volt. However, a suitable magnitude can be determined experimentally for each different type of material flowing in the pipe.

The bias voltage is provided by a direct current source 38 which is illustrated schematically in the drawing as a battery. However, any convenient D.C. source will be satisfactory. In addition, other means for developing a suitable voltage between the electrodes and the liquid might be used in some applications, e.g. by utilizing electrode and flow pipe materials which in combination with the particular liquid being measured generate an electric bias potential through chemical action.

The positive terminal of the source 38 may be connected to the metal pipe 12 in turn is connected to the liquid in the pipe by any convenient means, e.g. through the usual flanges (not shown) which connect the pipe ends to the adjacent metal pipe sections in contact with the liquid. The negative terminal of the source 38 is connected through a relatively large isolating resistor 36 to the junction between two other relatively large input resistors 32 and 34 which are connected together in series between the leads 28 and 30. Thus, the negative terminal of the source 38 is connected to the electrodes 14 and 16 through relatively high impedances. In place of the large resistors 32 and 34, the desired effect of high input impedance for the amplifier can in some cases be obtained by the use of appropriate negative feedback.

As noted above, the values of the voltage of source 38 and the impedances of the resistors in the circuit preferably are selected so that the negative voltage applied to each electrode 14 and 16 is between 0 and 1 volt. In one practical circuit, the voltage of the source 38 was 15 volts, and the resistance of resistors 32, 34 and 36 was approximately 10 megohms each. Resistor 36 serves as a current-limiting resistor, and resistors 32 and 34 provide a high impedance voltage-dividing network to apply the D.C. potential symmetrically to both electrodes.

The maximum bias voltage which can be used will depend upon the liquid flowing in the pipe 12. The magnitude should be maintained below the value which will cause decomposition of the flowing liquid or create gas bubbles on the electrodes 14 and 16. In most installations, the danger of gas formation will be avoided by maintaining the magnitude of the negative voltage between 0 and 1 volt.

What is claimed is:

1. In an electromagnetic flowmeter having electrodes arranged to make electrical contact with a flowing fluid and thereby to produce a signal proportional to the rate of fluid flow, that improvement which comprises bias means for applying to said electrodes a direct-current signal of negative polarity.

2. Apparatus as in claim 1 in which the electrodes are mounted in an electrically-conductive pipe, means for electrically insulating said electrodes from said pipe, said bias means comprising a D.C. power source, a pair of resistors each having a relatively high resistance, each of said electrodes being connected to the negative terminal of said direct-current source through a different one of said pair of resistors, the positive terminal of said source being connected to said pipe, and amplifier coupled to said electrodes to receive the flow-induced signal developed therebetween and to produce a corresponding high-powered signal.

3. Apparatus as in claim 2 including another resistor of relatively high resistance conected between said negative terminal of said source and the first-named resistors.

4. Apparatus as in claim 1 in which the voltage of the direct current signal applied to each electrode is less than that which would cause decomposition of the flowing fluid or produce gas bubbles at said electrodes.

5. Apparatus as in claim 4 in which said voltage is no greater than one volt.

References Cited

UNITED STATES PATENTS

| | | | |
|---|---|---|---|
| 2,733,604 | 2/1956 | Coulter | 73—194 |
| 3,177,709 | 4/1965 | Fischer | 73—194 |
| 2,611,268 | 9/1952 | Mellen | 73—194 |
| 3,242,729 | 3/1966 | Keller | 73—194 |
| 3,374,672 | 3/1968 | Horne | 73—194 |

CHARLES A. RUEHL, Primary Examiner